July 2, 1946. V. J. OLSON 2,402,976
SCRAPER
Filed Jan. 9, 1945 2 Sheets-Sheet 1

Inventor
Victor J. Olson
By
Glenn L. Fish
Attorney

July 2, 1946.  V. J. OLSON  2,402,976
SCRAPER
Filed Jan. 9, 1945  2 Sheets-Sheet 2
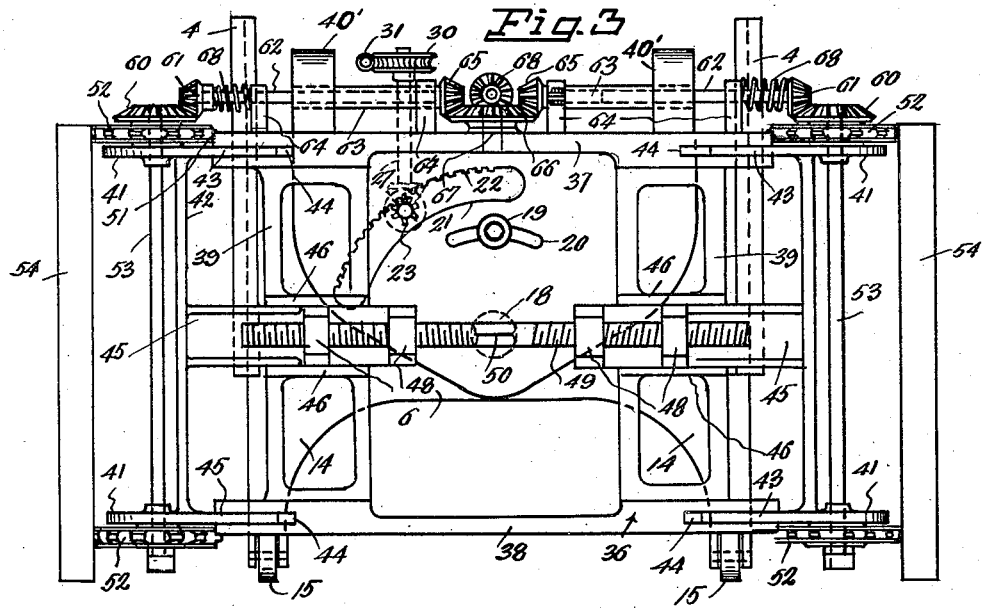
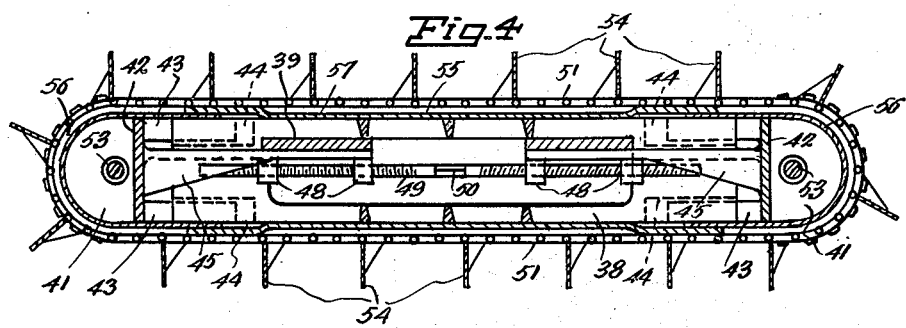
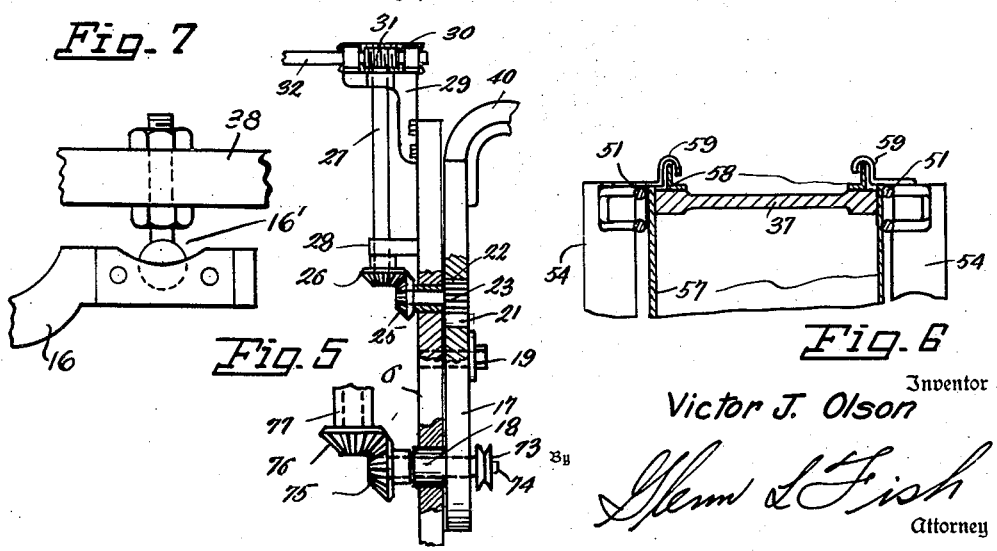
Inventor
Victor J. Olson
By Glenn L. Fish
Attorney Patented July 2, 1946

2,402,976

UNITED STATES PATENT OFFICE 2,402,976

SCRAPER

Victor J. Olson, Spokane, Wash.

Application January 9, 1945, Serial No. 572,037

8 Claims. (Cl. 37—109)

This invention relates to a scraping machine and it is one object of the invention to provide a machine which may be mounted on a tractor and used for building roads, filling ditches and trenches or low places in a road, for removing snow, and at other times and places when it is desired to spread material for filling depressions or removing surplus material and forming a smooth surface.

Another object of the invention is to provide an apparatus which may be readily mounted upon a tractor at the front thereof and includes an endless conveyor or scraper disposed in a vertical plane and having front and rear flights which move horizontally across the front of the tractor, the conveyor being provided with blades for engaging dirt, snow, or other material and moving same toward a side of the tractor to fill in a ditch or depression or move the surplus matter to a point where it may be readily removed and carted away.

Another object is to so form the scraping machine that it may be readily mounted at the front of the tractor and driven from a power take-off shaft of the tractor, the apparatus being so mounted that hydraulic jacks or lifts at sides of the tractor may be employed as means for shifting the device vertically to adjusted positions.

Another object is to provide improved means for tilting the device transversely to adjusted positions, said means being manually controlled and actuated by a wheel within reach of the operator of the tractor.

Still another object is to provide an apparatus of this character wherein the endless conveyor is trained about sprockets carried by shafts which are shiftable to positions in which chains of the conveyor will be tightened and prevented from slipping out of engagement with the sprocket wheels about which they travel.

And another object of the invention is to provide apparatus which is simple in construction, efficient in operation, and easy to apply to a tractor or remove therefrom.

The invention is illustrated in the accompanying drawings, wherein:

Fig. 3 is a view on an enlarged scale on the line 3—3 of Fig. 1, a casing omitted.

Fig. 4 is a sectional view on the line 4—4 of Fig. 2.

Fig. 5 is a fragmentary view showing a portion of the apparatus partially in elevation and partially in section.

Fig. 6 is a fragmentary sectional view taken through the upper portion of the conveyor.

Fig. 7 is a fragmentary view showing a mounting for the front end of a skid.

Figure 1:
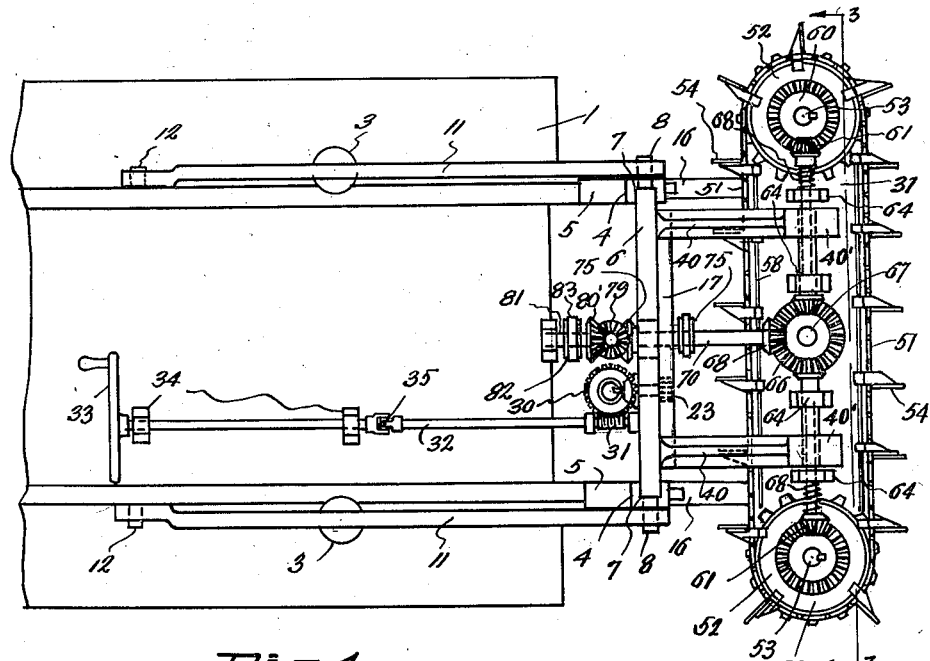
Fig. 1 is a top plan view showing the apparatus applied to a tractor in position for use.
Figure 2:
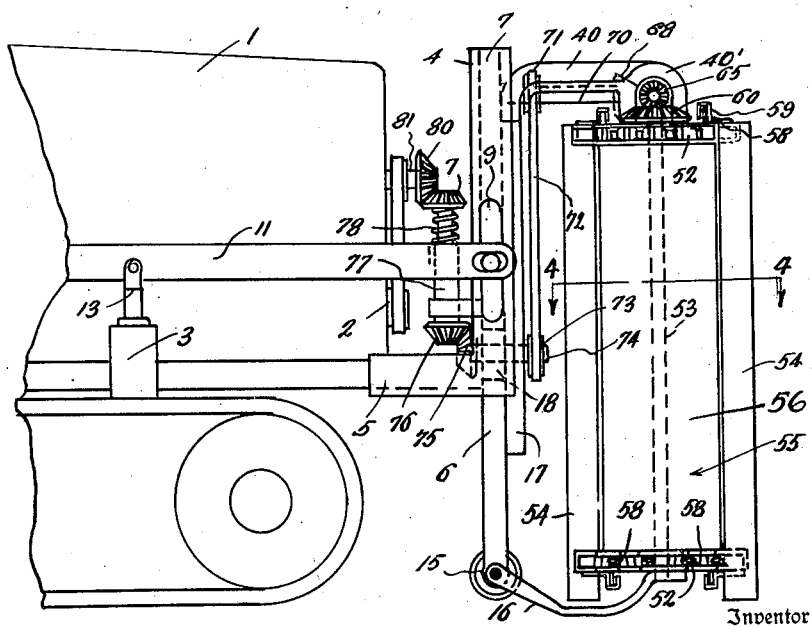
Fig. 2 is a side elevation of Fig. 1.

This improved scraper or grader is adapted for use as an attachment adapted to be applied to a tractor 1 which is of conventional construction and has a power take-off pulley 2 at its front and hydraulic lifts or jacks 3 at its opposite sides. The mounting frame of the attachment has standards 4 disposed vertically and provided with rearwardly extending arms 5 of such length that they may be connected with the tractor and mount the standards in advance of the tractor. A plate 6 extends between the standards and has its side edge portions engaged in grooves or tracks 7 formed in inner side faces of the standards so that the plate may be shifted vertically to adjusted positions. Lugs 8 project from opposite side edge faces of the plate and pass through slots 9 formed in the standards with their outer ends engaged in openings 10 formed in bars 11 which extend longitudinally of the tractor at opposite sides thereof and are mounted for vertical swinging movement by pins 12. The bars 11 are pivotally connected with the plungers 13 of the lifts or jacks 3 and when the jacks are actuated the bars will be swung vertically to raise or lower the plate 6 and support same in adjusted position. Legs 14 extend downwardly from lower corners of the plate 6 and at their lower ends carry rollers 15 for resting upon the ground. The legs also carry shoes or skids 16 projecting forwardly therefrom and pivotally mounted so that they may be swung vertically.

In front of the plate 6 is a plate 17 pivotally mounted by a stub shaft 18 passing through the plate 6 and, in order to limit pivotal movement of the plate 17, there has been provided a screw 19 which passes through an arcuate slot formed in the plate 17 and into an opening formed in the plate 6. A second arcuate slot 21 is formed through plate 17 and along the upper edge of slot 21 is a rack 22 with which meshes a pinion 23 carried by a shaft 24. The shaft 24 is journaled through the plate 6 and, at its rear end, carries a beveled gear 25 meshing with a beveled gear 26 at the lower end of a shaft 27. This shaft 27 is rotatably mounted through bearing brackets 28 and 29 and, at its upper end, carries a worm gear 30 meshing with a worm 31 carried by a shaft 32 which extends rearwardly along the tractor and carries a wheel 33 at its rear end within reach of the operator of the tractor, so that by turning the wheel the shaft may be rotated and tilting adjustment imparted to plate 17. The shaft 32 is rotatably mounted in bearings 34 and forwardly of the bearings is provided with a universal joint 35 in order that the forward portion of the shaft may have lateral movement as the plate 17 is tilted about its shaft 18.

Forwardly of the mounting formed by the plates 6 and 17 is a frame having an upper bar 37, a lower bar 38, and end bars 39. The shoes 16 have their front ends connected with the under face of the lower bar 38 by joints 16' shown in Figure 7 and from the top of the plate 17 project arms 40 terminating in bearings 40' fixed to the upper bar 37. Plates 41 are formed at upper and lower ends of struts 42 and these plates have arms or fingers 43 which project inwardly from the struts and are slidably engaged in grooves 44 formed in front and rear edge faces of the upper and lower bars 37 and 38 to shiftably mount the struts. Arms 45 extend inwardly from the struts and are slidably received between guide plates or ribs 46 projecting forwardly from the end bars 39. These arms 45 carry bearings 48 having threaded openings formed therethrough to receive the oppositely threaded end portions of a shaft 49 which has its mid-portion 50 squared for engagement by a wrench, and, from an inspection of Figs. 3 and 4, it will be seen that when the shaft 49 is turned, the struts will be shifted toward or away from the frame 36 for adjusting the tension of chains 51 trained about sprocket wheels 52 carried by upper and lower ends of shafts 53. The shafts 53 are disposed vertically and are rotatably mounted through the plates 41 and, when the shafts are rotated, the chains will be moved transversely of the frame 36 and dirt, snow, or the like engaged by blades 54 of the front flights of the chains will be carried toward a side of the apparatus to fill a ditch or clear a road and form an even surface for the road. A shield or casing 55 encloses the frame 36 and the shafts 53 so that dirt, snow, or the like, will be prevented from clogging the apparatus and this shield has its end sections 56 formed separate from the plates forming its front and rear sections 57 and overlapped by side portions of the plates so that the casing or shield may be expanded or contracted when the shaft 49 is turned to shift the struts 42 inwardly or outwardly and tighten or loosen the chains 51. Tracks 58 extend along front and rear edges of the bars 37 and 38 for engagement by hooks 59 carried by the upper and lower chains 55 and the chains will thus be held close to the frame 36.

In order that rotary motion may be transmitted to them, the shafts 53 carry beveled gears 60 which mesh with gears 61 at outer ends of the outer sections 62 of shafts 63. The shafts 63 and their outer sections are rotatably mounted in bearings 64 and, at their inner ends carry beveled gears 65 meshing with a beveled gear 66 rotatably mounted over the frame 36 by a post or stub shaft 67. Springs 68 urge the shaft sections 62 outwardly and maintain the gears 61 in mesh with the gears 60 when the struts 42 and the shafts 53 are shifted to various positions of adjustment. The gear 66 is in mesh with a gear 69 at the front end of a shaft 70 which is rotatably mounted and carries a pulley 71 about which is trained a belt 72. The belt extends vertically in front of plate 17 and has its lower portion trained about a pulley 73 carried by a shaft 74 which is journaled through the stub shaft 18 and, at its rear end, carries a beveled gear 75 meshing with a gear 76 at the lower end of a shaft 77. The shaft 77 has an upper section thrust upwardly by a spring 78 and this upper section carries a beveled gear 79 meshing with a gear 80 carried by a shaft 81 which is rotatably mounted at the front of the tractor and carries a pulley 82 so that rotary motion may be transmitted to the shaft 81 by a belt 83 trained about the pulleys 82 and 2. It will thus be seen that the conveyor or scraper consisting of the chains 51 and the blades 54 will be driven from the power take-off of the tractor and dirt or snow moved transversely across the path of the tractor as the tractor moves forwardly.

What is claimed is:

1. A scraper constituting an attachment for a tractor having a power take-off at its front and comprising a mounting frame adapted to be mounted at the front of the tractor and including vertical standards at sides of the frame and a plate carried by and shiftable vertically between the standards, a plate in front of the first plate tiltable transversely to adjusted positions, arms extending forward from the second plate, shoes extending forwardly from the first plate, a scraper frame disposed in a vertical plane and supported between the arms and shoes, shafts rotatably mounted vertically at opposite sides of the scraper frame, sprockets carried by upper and lower ends of said shafts, chains trained about said sprockets and having front and rear flights extending transversely of the scraper frame, vertical blades carried by and projecting outwardly from said chains, and means for transmitting motion from the power take-off of the tractor to said shafts.

2. A scraper constituting an attachment for a tractor having a power take-off at its front and comprising a mounting frame adapted to be mounted at the front of the tractor and including vertical standards at sides of the frame and a plate carried by and shiftable vertically between the standards, pins extending from opposite sides of said plate through vertical slots in said standards, bars extending longitudinally of said tractor at opposite sides thereof and having their front ends formed with openings through which said pins pass, said bars extending over and being connected with lifts of the tractor for vertical movement whereby to raise and lower the plate, a plate in front of the first plate mounted for transversely tilting movement, a scraper frame in front of the second plate, upper and lower bars for supporting the scraper frame carried by the second plate and the first plate, respectively, vertical shafts rotatably carried by the scraper frame at sides thereof, an endless carrier trained about and operated from said shafts and provided with scraping blades projecting outwardly, and means for transmitting rotary motion to said shafts from the power take-off of the tractor.

3. A scraper constituting an attachment for a tractor having a power take-off at its front, said scraper comprising a mounting structure adapted to be mounted at the front of the tractor and including a plate shiftable vertically, a plate in front of the first plate tiltable toward opposite sides thereof and formed with an arcuate slot having rack teeth along one edge thereof, a shaft journaled through the first plate with its front end passing through the slot, a pinion carried by said shaft within the slot and meshing with the rack for tilting the second plate to adjusted position when the shaft is turned, a countershaft rotatably mounted vertically of the first plate and geared to the first shaft, a worm gear at the upper end of the countershaft, an actuating shaft rotatably mounted longitudinally of the tractor and having a worm at its front end meshing with the worm gear and an operating wheel at its rear end, a scraper frame in front of the second plate, supporting arms for the scraper frame carried by said plates and extending forwardly therefrom, vertical shafts rotatably mounted at opposite sides of the scraper frame, sprocket wheels carried by the vertical shafts, an endless carrier trained about said sprocket wheels and having front and rear flights, scrapers carried by and projecting outwardly from said chains, and means for transmitting rotary motion from the power take-off of the tractor to the vertical shafts.

4. A scraper constituting an attachment for a tractor having a power take-off at its front, said scraper comprising a mounting structure adapted to be mounted at the front of the tractor and including a plate shiftable vertically, a plate in front of the first plate tiltable toward opposite sides thereof, means for shifting the second plate to adjusted positions, a scraper frame in front of the second plate having upper and lower bars and vertical end bars between the same, vertical struts at opposite sides of the scraper frame having plates at their upper and lower ends slidably engaged with the upper and lower bars thereof, arms extending inwardly from said struts and slidable across the end bars of the scraper frame, bearings carried by said arms and formed with threaded openings, an adjusting shaft extending between said arms and having oppositely threaded end portions engaged through the threaded openings of the bearings to shift the struts to adjusted positions, vertical shafts rotatably mounted through the plates of said struts and provided with sprockets at their ends, an endless carrier trained about the sprockets and having front and rear flights extending transversely of the scraper frame, scrapers carried by said carrier, and means for transmitting rotary motion from the power take-off of the tractor to the vertical shafts for operating the carrier.

5. A scraper constituting an attachment for a tractor having a power take-off at its front, said scraper comprising a mounting structure adapted to be mounted at the front of the tractor and including a plate shiftable vertically, a plate in front of the first plate tiltable toward opposite sides thereof, means for shifting the second plate to adjusted positions, a scraper frame in front of the second plate having upper and lower bars, auxiliary frame members at opposite sides of the scraper frame slidably engaged with the upper and lower bars for movement toward and away from the scraper frame to adjusted positions, vertical shafts rotatably carried by the auxiliary frame, sprockets carried by said shafts, an endless carrier trained about said sprockets and having front and rear flights extending transversely of the scraper frame, scrapers carried by said carrier, and means for transmitting rotary motion from the power take-off of the tractor to said shafts.

6. A scraper constituting an attachment for a tractor having a power take-off at its front, said scraper comprising a mounting structure adapted to be mounted at the front of the tractor and including a plate shiftable vertically, a plate in front of the first plate tiltable toward opposite sides thereof, means for shifting the second plate to adjusted positions, a scraper frame in front of the second plate having upper and lower bars, auxiliary frame members at opposite sides of the scraper frame slidably engaged with the upper and lower bars for movement toward and away from the scraper frame to adjusted positions, vertical shafts rotatably carried by the auxiliary frame, sprockets carried by said shafts, endless chains trained about said sprockets and having front and rear flights extending transversely of the scraper frame, blades extending vertically between said chains and projecting outwardly therefrom, tracks extending along the upper and lower bars adjacent front and rear edges thereof, hooks carried by said chains for engaging said tracks and preventing vertical displacement of the chains, and means for transmitting rotary movement from the power take-off of the tractor to the vertical shafts.

7. A scraper constituting an attachment for a tractor having a power-take-off at its front, said scraper comprising a mounting structure adapted to be mounted at the front of the tractor and including a plate shiftable vertically, a plate in front of the first plate tiltable toward opposite sides thereof, means for shifting the second plate to adjusted positions, a scraper frame in front of the second plate having upper and lower bars, auxiliary frame members at opposite sides of the scraper frame slidably engaged with the upper and lower bars for movement toward and away from the scraper frame to adjusted positions, vertical shafts rotatably carried by the auxiliary frame, sprockets carried by said shafts, an endless carrier trained about said sprockets and having front and rear flights extending transversely of the scraper frame, scrapers carried by said carrier, and means for transmitting rotary motion from the power take-off of the tractor to said vertical shafts including a beveled gear rotatably mounted intermediate the length of the upper bar of said scraper frame, beveled gears carried by upper ends of the vertical shafts, shafts rotatably mounted longitudinally of the upper bar and having gears at their ends meshing with the beveled gear and the gears of the vertical shafts, the shafts along the upper bar having outer sections shiftable longitudinally and urged outwardly to maintain gears carried thereby in mesh with the gears of the vertical shafts, and interconnected shafts between the beveled gear and the power take-off.

8. A scraper constituting an attachment for a tractor having a power take-off at its front, said scraper comprising a mounting structure adapted to be mounted at the front of the tractor and including a plate shiftable vertically, a plate in front of the first plate tiltable toward opposite sides thereof, means for shifting the second plate to adjusted positions, a scraper frame in front of the second plate having upper and lower bars, auxiliary frame members at opposite sides of the scraper frame slidably engaged with the upper and lower bars for movement toward and away from the scraper frame to adjusted positions, vertical shafts rotatably carried by the auxiliary frame, sprockets carried by said shafts, an endless carrier trained about said sprockets and having front and rear flights extending transversely of the scraper frame, scrapers carried by said carrier, and means for transmitting rotary motion from the power take-off of the tractor to said vertical shafts including a beveled gear rotatably mounted intermediate the length of the upper bar of said scraper frame, beveled gears carried by upper ends of the vertical shafts, shafts rotatably mounted longitudinally of the upper bar and having gears at their ends meshing with the beveled gear and gears of the vertical shafts, the shafts along the upper bar having outer sections shiftable longtiudinally and urged outwardly to maintain gears carried thereby in mesh with the gears of the vertical shafts, a counter shaft projecting forwardly from the second plate and having a gear at its front end meshing with the beveled gear, a pulley carried by said countershaft, a shaft rotatably mounted through the first and second mentioned plates and having a pulley at its front end, a belt trained about said pulleys, and a shaft rotatably mounted in vertical position back of the first plate and having its lower end geared to the transmission shaft and its upper end geared to the power take-off.

VICTOR J. OLSON.